United States Patent
Domercq et al.

(10) Patent No.: US 8,491,254 B2
(45) Date of Patent: Jul. 23, 2013

(54) INJECTING AIR INTO THE FLOW PATH OF A TURBOMACHINE COMPRESSOR

(75) Inventors: Olivier Stephane Domercq, Brie Comte Robert (FR); Vincent Paul Gabriel Perrot, Maisons-Alfort (FR); Jean-Pierre Poitevin, Chartrettes (FR)

(73) Assignee: SNECMA, Paris (FR)

( * ) Notice: Subject to any disclaimer, the term of this patent is extended or adjusted under 35 U.S.C. 154(b) by 456 days.

(21) Appl. No.: 12/991,812

(22) PCT Filed: Apr. 15, 2009

(86) PCT No.: PCT/FR2009/000438
§ 371 (c)(1),
(2), (4) Date: Nov. 9, 2010

(87) PCT Pub. No.: WO2009/156600
PCT Pub. Date: Dec. 30, 2009

(65) Prior Publication Data
US 2011/0058931 A1 Mar. 10, 2011

(30) Foreign Application Priority Data
Jun. 25, 2008 (FR) ...................... 08 03552

(51) Int. Cl.
*F01D 5/03* (2006.01)
(52) U.S. Cl.
USPC ........................... 415/115; 415/116; 415/160
(58) Field of Classification Search
USPC ................. 415/115, 116, 117, 159, 160, 180
See application file for complete search history.

(56) References Cited

U.S. PATENT DOCUMENTS

| | | | |
|---|---|---|---|
| 3,123,283 | A | 3/1964 | Leis |
| 4,856,962 | A | 8/1989 | McDow |
| 5,230,605 | A | 7/1993 | Yamaguchi et al. |
| 2004/0081552 | A1 | 4/2004 | Guemmer |
| 2006/0104805 | A1 | 5/2006 | Gummer |
| 2008/0298951 | A1* | 12/2008 | Brault et al. ................. 415/58.5 |

FOREIGN PATENT DOCUMENTS

| | | |
|---|---|---|
| DE | 102 33 032 | 1/2004 |
| EP | 0 477 740 | 4/1992 |
| EP | 1 609 999 | 12/2005 |
| GB | 799 675 | 8/1958 |

OTHER PUBLICATIONS

U.S. Appl. No. 13/000,929, filed Dec. 22, 2010, Domercq.
U.S. Appl. No. 13/703,809, filed Dec. 12, 2012, Perrot, et al.
International Search Report issued Sep. 15, 2009 in PCT/FR09/000438 filed Apr. 15, 2009.

* cited by examiner

*Primary Examiner* — Edward Look
*Assistant Examiner* — Maxime Adjagbe
(74) *Attorney, Agent, or Firm* — Oblon, Spivak, McClelland, Maier & Neustadt, L.L.P.

(57) ABSTRACT

A turbomachine compressor including variable-pitch vanes, each including an airfoil connected via a plate of circular outline to a pivot guided to pivot in an orifice in a casing, the plate including an air feed duct including one end for communication with a passage formed in the casing when the vane is in a first position, so as to inject air into the annulus of the compressor upstream from the vane, and to be closed by the casing when the vane is in a second position.

14 Claims, 3 Drawing Sheets

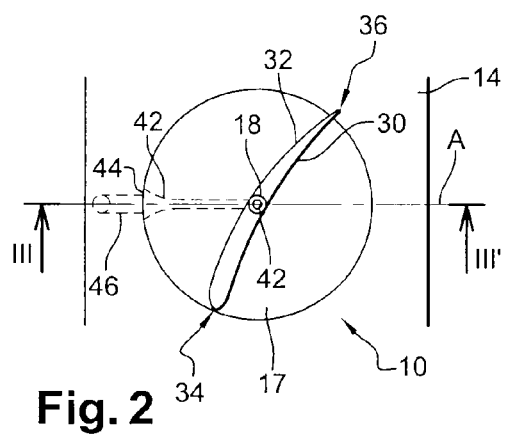
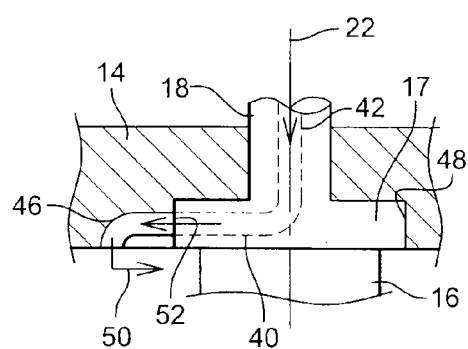
Fig. 2    Fig. 3
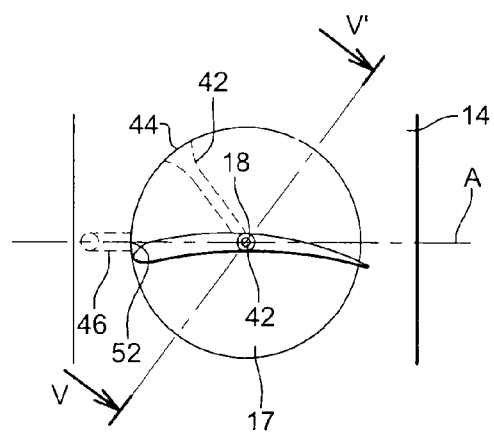
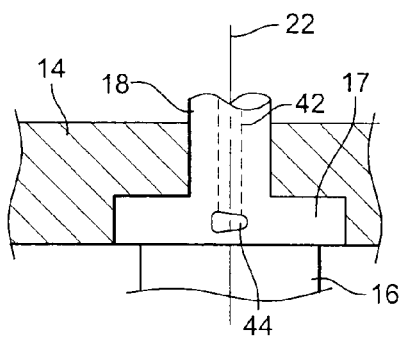
Fig. 4    Fig. 5

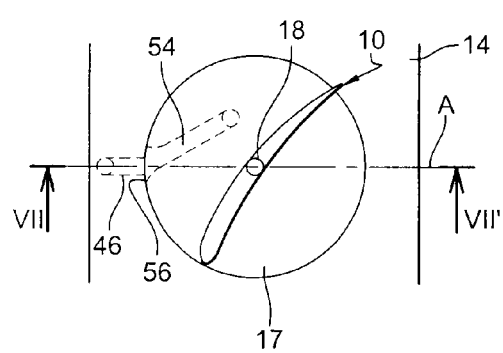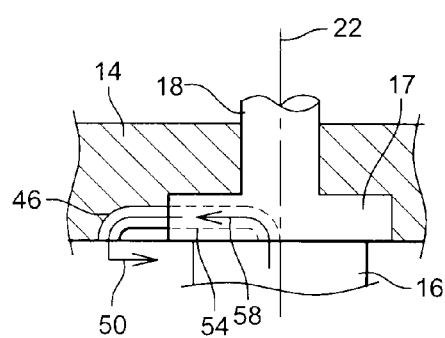
Fig. 6
Fig. 7
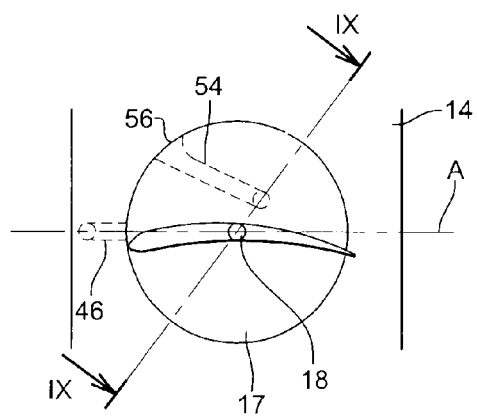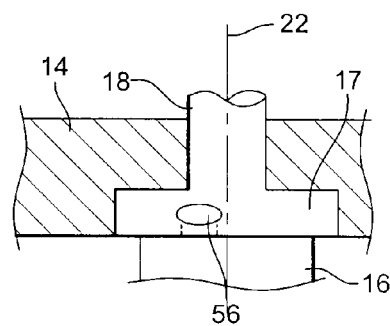
Fig. 8
Fig. 9

INJECTING AIR INTO THE FLOW PATH OF A TURBOMACHINE COMPRESSOR

The present invention relates to a compressor of a turbomachine such as an airplane turboprop or turbojet, the compressor including at least one nozzle stage with variable-pitch vanes.

The variable-pitch vanes of the nozzle are carried by an outer casing of the compressor and each of them comprises an airfoil that is connected at its radially outer end via a plate of substantially circular outline to a radial cylindrical pivot that defines the pivot axis of the vane and that is generally centered and guided in pivoting in a corresponding orifice in the outer casing. In general, the radially-inner end of the vane has a second cylindrical pivot that extends along the pivot axis of the vane and that is guided in pivoting in an orifice in an inner casing of the compressor. The outer pivot of the vane is connected via a crank to a control ring that is turned around the outer casing by an actuator or the like. Turning the control ring causes the crank to make the vanes pivot about their axes.

Varying the pitch angle of the stator vanes in a turbomachine is intended to adapt the geometry of the compressor to its operating point, and in particular to optimize the efficiency and the pumping margin of the turbomachine and to reduce its fuel consumption in different flight configurations.

Each of the vanes is suitable for pivoting about its axis between an "open" or "fully-open" position in which each vane extends substantially parallel to the longitudinal axis of the turbomachine, and a "closed" or "quasi-closed" position in which the vanes are inclined relative to the axis of the turbomachine, thereby reducing the flow section for air through the stage of vanes. When the vanes are in the open position, the rate at which air flows through the compressor has a maximum value, and when the vanes are in the closed position, the rate at which air flows through the compressor has a minimum value (at a given speed of operation). The vanes can adopt intermediate positions between those two extreme positions so as to vary the rate at which air flows through the compressor.

When the turbomachine is operating at low speed or when it is idling, the variable-pitch vanes are moved to their closed position, and when the turbomachine is operating at full throttle (e.g. for takeoff), the vanes are moved to their open position.

At low speed, in spite of the closed position of the stator vanes, the angle of incidence between the flow direction of the air in the compressor annulus and the profile of the vanes may reach high values that give rise to the air flow separating from the vanes, thereby further reducing the flow section for air through the vane stage. These separation zones are located mainly at the radially-inner and outer ends of the vanes and they disappear when the angle of incidence of the fluid against the vanes drops to smaller values.

It is known to limit such separation by injecting or sucking air into or from the corresponding zones. Nevertheless, the geometry of such injection or suction is generally constant, and the injection or suction is beneficial at a given speed of operation of the compressor, but its permanent presence, including at speeds at which it is not needed, can affect the performance of the engine (by degrading the efficiency of the compressor and thus by degrading specific consumption). In addition, constant geometry for injection or suction puts a limit on any ability to optimize the pumping margin of a compressor.

A particular object of the invention is to avoid those drawbacks in a manner that is simple, effective, and inexpensive.

To this end, the invention proposes a turbomachine compressor comprising an annular casing and at least one nozzle stage formed by an annular row of variable-pitch vanes, each comprising an airfoil connected at least one end via a plate of substantially circular outline to a radially-extending cylindrical pivot guided in pivoting in a corresponding orifice in the casing, each vane being pivotable about an axis defined by the pivot of the vane between a first position and a second position, the compressor being characterized in that the plates of at least some of the vanes include respective ducts for feeding air to respective passages formed in the casing, each passage having one end opening out into the annulus of the compressor to inject air into said annulus upstream from the vane, the feed duct formed in the plate having one end for communicating with the corresponding passage in the casing when the vane is in the first position, and for being closed by the casing when the vane is in the second position, so that the rate at which air is injected depends on the pitch angle of the vanes.

Advantageously, the vanes are movable between an open position and a closed position, the feed ducts of the vanes being designed to communicate with the passages in the casing when the vanes are in the closed position or in an intermediate position, and for being closed by the casing when the vanes are in the open position.

Under such circumstances, with the vanes in the open position, the ducts in the plates are closed by the casing and no air is injected into the annulus. The efficiency of the turbomachine is therefore unaffected by air being injected which is unnecessary at high speeds for which the vanes are in the open position. When the vanes are in the closed position or in an intermediate position, the ducts in the plates communicate with the passages formed in the casing, and air is then injected upstream into the annulus of the compressor in order to reduce the above-mentioned air flow separation (separation which may occur on the stator vanes or on the blades of a rotor wheel situated downstream), thereby improving the performance of the turbomachine at low speeds or at intermediate speeds.

In other words, adjusting the annular position of the stator vanes makes it possible to modulate the rate at which air is injected into the annulus of the compressor, with this rate being zero at high speed so as to avoid penalizing and degrading specific consumption of the engine, and having a determined value at low speed or at an intermediate speed in order to reduce air flow separation on the vanes of the nozzle. The maximum rate at which air is injected may, for example, represent less than 5% of the rate at which air flows in the annulus of the compressor. This rate varies as a function of the pitch angle of the vanes and it may take on in-between values when the vanes are in intermediate positions. The rate at which air is injected may be calibrated accurately by determining the sections of the ducts formed in the plates and in the casing.

Advantageously, the passages formed in the casing open out into the annulus of the compressor upstream from the nozzle stage or upstream from a rotor wheel of a preceding nozzle stage of the compressor. The inlets of the passages in the casing preferably open out in the cylindrical walls of housings for receiving the plates of the vanes. According to another characteristic of the invention, the outlet from the duct in each plate may then be situated in the peripheral edge of the plate.

The outlet of the duct in each plate may be substantially circular, triangular, oblong, rectangular, or trapezoidal in shape.

The inlet of the feed duct of each plate may open out into the annulus of the compressor, e.g. beside the suction side of the airfoil of said vane, in order to take air from said annulus. This causes air to recirculate from downstream to upstream over the nozzle. Bleeding air from beside the suction side of the airfoils of the vanes serves to limit the above-mentioned separation of air. It is on the suction side of the airfoils of the vanes that the stream of air flowing in the annulus is subjected to a recompression phenomenon that encourages the creation of separation zones close to the trailing edges of the airfoils.

In a variant, each plate is connected at its inlet to a duct extending substantially radially in the pivot of the vane and that is connected to an air bleed channel, e.g. coming from a downstream point of the compressor annulus.

Air injection may take place via the radially-outer ends or via the radially-inner ends of the vanes of the nozzle, or via both ends. Air injection via one of the ends of the vanes serves to avoid air separation on the vanes, in particular in zones that are close to the casing (radially-inner and/or outer ends), and may have a positive impact over the entire radial extent thereof.

The invention also provides a turbomachine, such as a turbojet, an airplane turboprop, a helicopter turbine engine, or an industrial machine, characterized in that it includes a compressor of the above-specified type.

Finally, the invention provides a variable pitch nozzle vane for a compressor as described above, characterized in that it comprises an airfoil connected at one end via a plate of substantially circular outline to a cylindrical pivot defining the pivot axis of the vane, the plate including a duct having one end opening out into its peripheral edge.

The other end of the duct may be connected to a duct extending substantially radially in the cylindrical pivot. In a variant, the other end of the duct opens out into a face of the plate to be situated beside the airfoil.

The invention can be better understood and other details, characteristics, and advantages of the present invention appear more clearly on reading the description given by way of non-limiting example and with reference to the accompanying drawings, in which:

FIG. 2 is a fragmentary diagrammatic plan view of a variable-pitch vane in its closed or quasi-closed position;

FIG. 3 is a section view on line III-III' of FIG. 2;

FIG. 4 is a view corresponding to FIG. 2 and shows the variable-pitch vane in its open or fully-open position;

FIG. 5 is a section view on line V-V' of FIG. 4;

FIG. 6 is a fragmentary diagrammatic plan view of a variant embodiment of the variable-pitch vane in the closed position;

FIG. 7 is a section view on line VII-VII' of FIG. 6;

FIG. 8 is a view corresponding to FIG. 6 and shows the variable-pitch vane in the open position; and FIG. 9 is a section view on line IX-IX' of FIG. 8.

Figure 1:
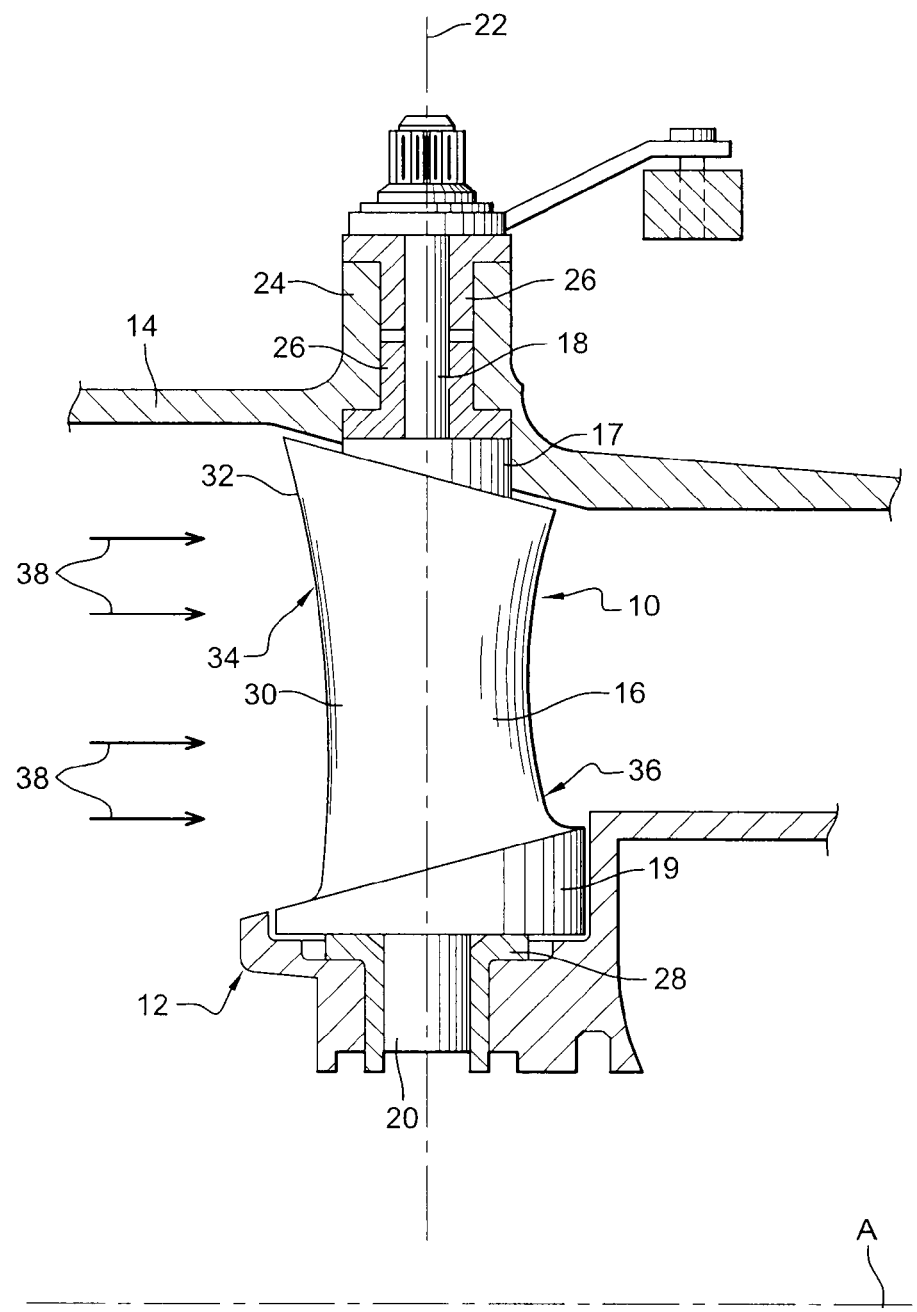
FIG. 1 is a fragmentary diagrammatic half-view in axial section of a nozzle of a turbomachine compressor.

Reference is made initially to FIG. 1 which shows a nozzle stage having variable-pitch vanes 10 for a high pressure compressor in a turbomachine, these vanes 10 being regularly distributed around the longitudinal axis A of the turbomachine and extending substantially radially between an inner casing 12 and an outer casing 14 of the compressor.

Each vane 10 comprises an airfoil 16 connected at its radially outer end via a first plate 17 to a radially-extending cylindrical pivot 18, and at its radially-inner end via a second plate 19 to a radially-extending vertical pivot 20, these inner and outer pivots 20 and 18 defining the pivot axis 22 of the vane.

The outer cylindrical pivot 18 is engaged in a cylindrical chimney 24 in the outer casing 14 and it is pivotally guided in said chimney by cylindrical rings 26. The inner cylindrical pivot 20 is engaged in a cylindrical housing in the inner casing 12 and it is centered and pivotally guided in said housing by a cylindrical bushing 28.

The airfoil 16 of each vane 10 has a pressure side 30 and a suction side 32 that are interconnected at an upstream end by a leading edge 34 and at a downstream end by a trailing edge 36 where "leading" and "trailing" are relative to gas 38 flowing in the annulus of the compressor (FIGS. 1 and 2). The inner and outer plates 19 and 17 both have substantially circular outlines and they are received in respective recesses of complementary shapes in the inner casing 12 and in the outer casing 14.

The vanes 10 are pivotable about their axes 22 between a closed or quasi-closed position, shown in FIG. 2 and an open or fully-open position shown in FIG. 4.

In the closed position of FIG. 2, the airfoils 16 of the vanes are inclined relative to the longitudinal axis A of the turbomachine and between them they define a minimum section for passing air in the annulus. The vanes 10 are put in this position when the turbomachine is operating slowly or idling, with the flow rate of air flowing through the compressor then having a minimum value.

In the open position of FIG. 4, the airfoils 16 of the vanes extend substantially parallel to the axis A of the turbomachine such that the air flow section between the airfoils is at a maximum. The vanes 10 are put into this position when the turbomachine is operating at full throttle, with the air flow rate through the compressor then having a maximum value.

In the closed position, the air flow over the airfoils 16 is at a large angle of incidence, thereby causing the air flow to separate from the airfoils 16, with such separation of air disappearing when the vanes 10 come closer to their nominal operating conditions.

The invention serves to eliminate or at least reduce this drawback by injecting air upstream from the vanes 10 into the radially inner and/or outer ends of the airfoils of the vanes, the injected air flow rate being at a maximum when the vanes are in the closed position in order to avoid creating the above-mentioned separation, and zero when the vanes are in the fully-open position so as to avoid having a negative effect on the performance of the turbomachine at high speeds. For this purpose, the flow rate of the injected air depends on the pitch angle of the vanes 10.

In the present invention, the air that is to be injected into the annulus is conveyed via ducts formed through the inner and/or outer plates of at least some of the vanes of a compressor stage, these ducts communicating with passages in the corresponding casing of the compressor for conveying air to the annulus.

When the inner plate 19 includes such air ducts, air passages are formed in the inner casing 12, and when the outer plate 17 includes such air ducts, air passages are formed in the outer casing 14.

For reasons of clarity, the embodiments of the invention that are described below relate solely to air ducts formed in the outer plates 17 of the vanes for the purpose of communicating with corresponding passages in the outer casing 14. Nevertheless, these embodiments are also applicable to the inner plates 19 of the vanes and to the inner casing 12.

In the embodiment of FIGS. 2 to 5, an air feed duct 40 is formed through the plate 17 of each vane 10. The duct 40 is substantially rectilinear and extends substantially radially relative to the pivot axis 22 of the vane. It opens out at one end to the peripheral edge of the plate 17 and its opposite end is connected to the radially-inner end of another duct 42 that extends substantially radially along the axis of the pivot 18 of the vane. The radially-inner end of this duct 42 is connected by suitable means to means for bleeding air from the compressor further downstream. The opening 44 of the duct 40 is situated at the periphery of the plate and is substantially circular, triangular, oblong, rectangular, or trapezoidal in shape for the purpose of communicating with a passage 46 formed in the casing 14 when the vane is in the closed position (FIGS. 2 and 3) and it is closed by the casing when the vane is in the open position (FIGS. 4 and 5).

The passage 46 in the casing is substantially L-shaped and one end opens out into the cylindrical wall 48 of the recess in the casing receiving the plate 17, while its other end opens out into the annulus of the compressor in order to inject air into said annulus (arrow 50). The opening 52 of the passage 46 in the wall 48 may be of arbitrary shape. The particular geometrical shapes for the openings 44 of the ducts 40 serve to vary the flow rate of air passing through said ducts in a manner that is linear or non-linear depending on the pivotal movement of the vanes about their axes.

When the vanes 10 are in the closed position (FIGS. 2 and 3), the ducts 40 in the plates are in alignment with the passages 46 in the casing. Air then flows along the ducts 42 in the pivots, along the ducts 40 in the plates, and then along the passages 46 in the casing, with the air then being injected into the annulus of the compressor (arrow 50) in order to oppose the air flow separating from the airfoils 16 of the vanes 10. The rate at which air is injected into the annulus is then a maximum value.

When the vanes 10 are in the open position (FIGS. 4 and 5), the ducts 40 in the plates do not communicate with the passages 46 in the casing so no air is injected into the annulus of the compressor. In this position, the openings 44 of the ducts in the plates are closed by the wall 48 of the recess in the casing 14, and the inlets of the passages 46 in the casing are closed by the peripheral edges of the plates 17.

It is possible to calibrate the rate at which air is injected into the annulus very accurately by determining the sections of the ducts and passages formed in the plate and in the casing.

The vanes 10 may adopt one or more intermediate positions between the positions shown in FIGS. 2 and 4, with the rate at which air is injected then being a function of the air flow section in the ducts 40 in the plates and in the passages 46 in the casing.

In the variant embodiment shown in FIGS. 6 to 9, the passages 46 in the casing are identical to those in FIGS. 2 to 5.

The ducts 54 in the plates 17 extend over a fraction of the transverse dimension of the plates and they are substantially L-shaped. They have respective outlets 56 opening out in the peripheral edged of the plates 17 and inlets opening out in the faces of the plates that are situated beside the corresponding airfoils 16 of the vanes. Each such duct inlet 54 opens out beside the suction side of the airfoils 16 of the vane where air is at a slightly reduced pressure. The outlets 56 of the ducts 54 situated in the peripheral edges of the plates are substantially oval or oblong in shape in the example shown.

FIGS. 6 and 7 show a vane 10 in the closed position in which the duct 54 in the plate communicates with the passage in the casing 14. A fraction of the air flowing in the annulus of the compressor is then bled off (arrow 58) via the ducts 54 in the plates, flows from downstream to upstream along the ducts, and then along the passages 46 in the casing so as to be reinjected upstream from the vane.

When the vanes 10 are in the open position shown in FIGS. 8 and 9, the passages 46 and the ducts 54 no longer communicate with one another.

The passages 46 formed in the casing 14 may open out into the annulus of the compressor directly upstream from the stage of vanes 10. In a variant, these passages may extend over a given length in the casing and in a determined direction so as to open out into the annulus upstream from a rotor wheel of the compressor or upstream from some other nozzle stage of the compressor.

The invention claimed is:

1. A turbomachine compressor comprising:
   an annular casing; and
   at least one nozzle stage including an annular row of variable-pitch vanes, each comprising an airfoil connected at at least one end via a plate of substantially circular outline to a radially-extending cylindrical pivot guided in pivoting in a corresponding orifice in the casing, each vane being pivotable about an axis defined by the pivot of the vane between a first position and a second position,
   wherein the plates of at least some of the vanes include respective ducts for feeding air to respective passages formed in the casing, each passage including one end opening out into an annulus of the compressor to inject air into the annulus upstream from the vane, the feed duct formed in the plate including one end communicating with the corresponding passage in the casing when the vane is in the first position, and being closed by the casing when the vane is in the second position, so that a rate at which air is injected depends on a pitch angle of the vanes.

2. A compressor according to claim 1, wherein the vanes are movable between an open position and a closed position, the feed ducts of the vanes being configured to communicate with the passages in the casing when the vanes are in the closed position or in an intermediate position, and to be closed by the casing when the vanes are in the open position.

3. A compressor according to claim 1, wherein the feed ducts are formed in radially-outer plates of the vanes, and are configured to communicate with passages formed in an outer casing surrounding the vanes.

4. A compressor according to claim 1, wherein the feed ducts are formed in radially-inner plates of the vanes, and are configured to communicate with passages formed in an inner casing surrounded by the vanes.

5. A compressor according to claim 1, wherein the end of the feed duct of the plate that is to be closed by the casing is situated in a peripheral edge of the plate.

6. A compressor according to claim 1, wherein the feed duct of the plate opens out at its other end into the annulus of the compressor downstream from the vane to bleed air from the annulus.

7. A compressor according to claim 1, wherein the feed duct of the plate is connected to a duct extending substantially radially that is formed in the pivot of the vane and that is connected at its radially-outer end to a channel for bleeding air from the compressor annulus downstream from the nozzle stage.

8. A compressor according to claim 1, wherein the closable end of the duct in the plate is substantially circular, triangular, oblong, rectangular, or trapezoidal in shape.

9. A compressor according to claim 1, wherein the passage in the casing opens into the annulus of the compressor upstream from a preceding nozzle stage or from a compressor rotor wheel.

10. A compressor according to claim 1, wherein the passage in the casing extends upstream from a recess housing the plate of the vane.

11. A turbomachine, a turbojet, an airplane turboprop, a turbine engine, or an industrial machine, comprising a compressor according to claim 1.

12. A variable pitch nozzle vane for a compressor according to claim 1, the vane comprising an airfoil connected at at least one end via a plate of substantially circular outline to a cylindrical pivot defining the pivot axis of the vane, the plate including a duct including one end opening out into its peripheral edge.

13. A vane according to claim 12, wherein the other end of the duct is connected to another duct formed in the cylindrical pivot.

14. A vane according to claim 12, wherein the other end of the duct opens out into a face of the plate, situated beside the airfoil.

* * * * *